(12) United States Patent
Soncrant

(10) Patent No.: US 10,737,742 B2
(45) Date of Patent: Aug. 11, 2020

(54) FOUR BAR REAR SUSPENSION FOR A BICYCLE

(71) Applicants: Jeffrey Soncrant, Encinitas, CA (US); Eminent Cycles, LLC, Encinitas, CA (US)

(72) Inventor: Jeffrey Soncrant, Encinitas, CA (US)

(73) Assignee: Eminent Cycles, LLC, Encinitas, CA (US)

( * ) Notice: Subject to any disclaimer, the term of this patent is extended or adjusted under 35 U.S.C. 154(b) by 0 days.

(21) Appl. No.: 15/778,530

(22) PCT Filed: Nov. 21, 2016

(86) PCT No.: PCT/US2016/063160
§ 371 (c)(1),
(2) Date: May 23, 2018

(87) PCT Pub. No.: WO2017/091516
PCT Pub. Date: Jun. 1, 2017

(65) Prior Publication Data
US 2018/0346059 A1 Dec. 6, 2018

Related U.S. Application Data

(60) Provisional application No. 62/259,204, filed on Nov. 24, 2015.

(51) Int. Cl.
*B62K 25/28* (2006.01)
*B62K 25/30* (2006.01)
*B62K 19/16* (2006.01)
*B62L 1/00* (2006.01)

(52) U.S. Cl.
CPC ............. *B62K 25/286* (2013.01); *B62K 19/16* (2013.01); *B62K 25/30* (2013.01); *B62L 1/005* (2013.01)

(58) Field of Classification Search
CPC ........ B62K 25/286; B62K 25/30; B62L 1/005
See application file for complete search history.

(56) References Cited

U.S. PATENT DOCUMENTS

| | | | |
|---|---|---|---|
| 4,497,506 A * | 2/1985 | Miyakoshi | B62K 25/286 280/124.105 |
| 5,901,974 A | 5/1999 | Busby et al. | |
| 6,102,421 A | 8/2000 | Lawwill et al. | |
| 6,343,675 B1 * | 2/2002 | Seymour | B62L 3/00 188/24.11 |

(Continued)

*Primary Examiner* — Kevin Hurley
*Assistant Examiner* — Michael R Stabley
(74) *Attorney, Agent, or Firm* — Lewis Kohn & Walker LLP; David M. Kohn; Kari Moyer-Henry

(57) ABSTRACT

A bicycle frame is adapted to provide suspension to a human user. The bicycle frame has a top tube and down tube connected to a head tube. A seat tube, fixed to the top tube and down tube connects to the bottom bracket. A chain stay is rotatably coupled to the seat tube at a chain stay pivot. A seat stay is rotatably coupled to the seat tube at a seat stay pivot. An upper shock mount is attached to a distal end of the seat stay forward of the seat stay pivot. A lower shock mount is attached to the chain stay rearward of the seat stay pivot. A shock is connected to the upper shock mount and the lower shock mount passing the seat tube from forward to rearward. A rear axle plate is attached to the seat stay and the chain stay and configured to accommodate a rear axle.

14 Claims, 6 Drawing Sheets

(56) References Cited

U.S. PATENT DOCUMENTS

| | | | |
|---|---|---|---|
| 7,938,424 B2 | 5/2011 | Arraiz | |
| 8,646,797 B2 | 2/2014 | Buckley | |
| 2005/0253357 A1* | 11/2005 | Chang | B62K 25/286 |
| | | | 280/283 |
| 2006/0033306 A1* | 2/2006 | Sanchez | B62K 25/26 |
| | | | 280/283 |
| 2007/0278055 A1* | 12/2007 | Chen | B62K 19/38 |
| | | | 188/2 D |
| 2009/0283986 A1 | 11/2009 | Falke | |
| 2013/0093160 A1 | 4/2013 | Alsop | |
| 2015/0054250 A1 | 2/2015 | Hu | |

* cited by examiner

FOUR BAR REAR SUSPENSION FOR A BICYCLE

RELATED APPLICATIONS

This application is a United States National Stage Application claiming priority under 35 U.S.C. 371 from International Patent Application No. PCT/US2016/63160 filed Nov. 21, 2016, which claims the benefit of priority from Provisional Patent Application No. 62/259,204 filed Nov. 24, 2015, the entire contents of which are herein incorporated by reference.

FIELD OF THE INVENTION

The present invention provides a bicycle frame. Specifically, the present invention pertains to bicycle frame systems for mountain and/or off road bicycles wherein the frame is comprised of a suspension system and floating brake design resulting in improved traction of the rear wheel during off road conditions and during braking.

BACKGROUND OF THE INVENTION

Suspension systems for bicycles suffer from a number of performance problems. For example, when riding during off road conditions, there may be a loss of rear wheel traction. Similarly, during off road conditions, there may be a loss of rear wheel suspension when braking.

Improper force management of bumps and braking forces may result and cause a bicycle to come off the ground during off road trail riding. Manufacturing misalignments may cause binding conditions within the suspension and linkage locations that are far removed from the rear axle and can promote binding in the suspension assembly during operation.

In light of the above, it is an object of the present invention to provide the desired features described herein in addition to addressing the performance problems of existing suspension systems.

SUMMARY OF THE INVENTION

The bicycle suspension system of the present invention is an improvement over the rear suspension systems known in the prior art. The suspension system provides improved bicycle control for both off road and trail conditions by identifying the pivot locations or zones, placing the shock onto the primary moving structural members of the suspension and by simplifying and/or reducing the number of parts required for the floating brake mount.

The combination of pivot locations, shock attachment locations and brake mounting bracket simplification make up the bicycle rear suspension system. The system parameters and enhancements aim to improve suspension sensitivity and neutralize braking induced suspension compression during riding for improved rider control. The subsequent detailed description discloses the three primary elements (structure and pivots, shock mounting, and brake mounting) of the novel design which comprise the system.

One object of the present invention is to provide a bicycle frame system wherein rearward movement of the axle/wheel during bump interaction results in the wheel engaging the ground longer by traveling with the bump instead of hopping over the bump, thereby increasing tire interaction/adherence to the ground.

It is another object of the present invention to provide a bicycle frame system having a shock that mounts to the seat stay and chain stay for direct shock interaction and proper force transfer to said shock without frame flexure or binding. The frame suspension system transfers movement directly to the shock for better sensitivity that leads to improved tire adherence to the ground.

It is yet another object of the present invention to provide a pivoting brake mount that enables the brake to travel with the rear wheel and transfer forces away from the direction of suspension travel instead of adding to the bump forces and prematurely loading the suspension to shock limits (this causes suspensions to firm up and no longer absorb bumps).

It is still another object of the present invention to provide a counter rotation of the rear wheel during braking to reduce chain growth caused by suspension movement. Typically, chain growth results in rider pedal feedback and suspension compression retarding.

BRIEF DESCRIPTION OF THE DRAWINGS

The novel features of this invention, as well as the invention itself, both as to its structure and its operation, will be best understood from the accompanying drawings, taken in conjunction with the accompanying description, and in which.

The invention can be better visualized by turning now to the following examples.

DETAILED DESCRIPTION OF THE INVENTION

Figure 1:
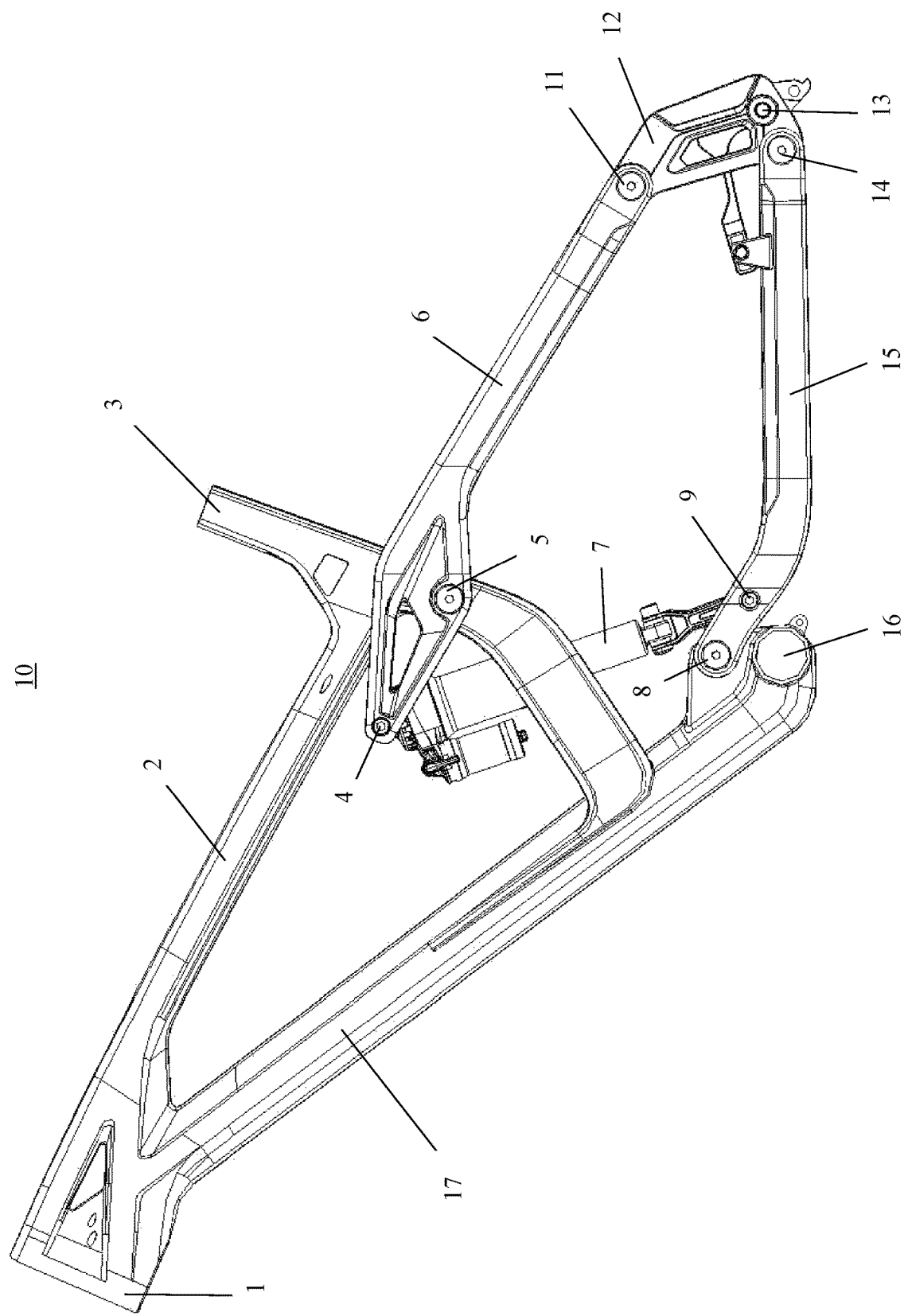
FIG. 1 illustrates the front triangle of the present invention.

A bicycle frame 10 adapted to provide suspension to a human user is shown in FIG. 1. The bicycle frame 10 has a head tube 1 that is configured to hold handle bars (not shown). A top tube 2 and down tube 17, or a monocoque structure, attaches to a head tube 1 and seat tube 3. The seat tube 3 and down tube 17 also attach to a bottom bracket 16 configured to hold the cranks (not shown) and pedals (not shown). The combination of head tube 1, top tube 2, down tube 17, seat tube 3 and bottom bracket 16 make up what is defined as a rigid front triangle. A chain stay 15 is rotatably coupled to the seat tube 3 at a first chain stay pivot 8.

In an alternative embodiment, the chain stay 15 may be rotatably couple to the down tube 17. A seat stay 6 is rotatably coupled to the seat tube 3 at a seat stay pivot 5. In an alternative embodiment, the seat stay 6 may be rotatably coupled to the top tube 2. An upper shock mount 4 is attached to a distal end of the seat stay 6 forward of the seat stay pivot 5. A lower shock mount 9 is attached to the chain stay 15 rearward of the first chain stay pivot 8.

In an alternative configuration, the lower shock mount 9 is attached forward of the first chain stay pivot 8 or at the first chain stay pivot 8. A shock 7 is connected to the upper shock mount 4 and the lower shock mount 9 passing the seat tube 3 from forward to rearward. If the lower shock mount 9 is positioned in the alternative configuration, the shock 7 may not pass the seat tube 3 from forward to rearward. Rear axle plates 12 are attached to the seat stay 6 and the chain stay 15 rotatably at points 11 and 14 and configured to accommodate a rear axle 13. The axle plate pivot points should be no further than 300 mm away from the rear axle centerline.

The frame 10 has primary structural members and pivots that enable the suspension to move. The pivot locations of the four bar design of the present invention are critical for determining and managing the rear axle path and its association to leverage ratio, chain growth/pedal kickback, pedal induced compression, and brake induced compression. When the suspension encounters a bump, the axle 13, axle plates 12, seat stay 6, and chain stay 15 rotate in an upward direction about the front triangle pivoting around the four main pivots (5,8,11,14) until the bump force is absorbed by the shock 7 at which point the suspension is returned to the start position by shock forces.

The shock 7 in the present invention is repositioned from a front triangle mounting configuration as described in the prior art to the moving structural members of the rear suspension (the seat stay 6 and chain stay 15), as described herein. The shock 7 consists of a compression type shock in order to support the present invention instead of a pull type as commonly used. The shock 7 is positioned forward of the seat stay pivot 5 at the front of the triangle and rearward of the second chain stay pivot 8 which is positioned above the bottom bracket 16. As the suspension rotates upward about the four main pivots (5,8,11,14) the shock 7 is compressed by the seat stay 6 pushing downward and the chain stay 15 pushing upward. The location of the shock 7 and mounts with respect to the chain stay 15 and seat stay 6 are visualized in FIG. 1. By moving the shock 7 from a single structural arm actuation to the two structural arm configuration, all of the bump forces encountered by the rear suspension are channeled to the bump management device instead of losing forces to frame/system flexure or shock binding (moving structural member loading off axis to a fixed front triangle mounted shock) resulting in a more reactive suspension and ultimately increased control to the rider.

The mounting of the shock to two moving members from one moving member also distributes the forces evenly, enabling lighter, more efficient (weight savings) structural members (seat stay and chain stay). This new mounting condition creates a more responsive suspension and ultimately improves the control of the bicycle.

Figure 2:
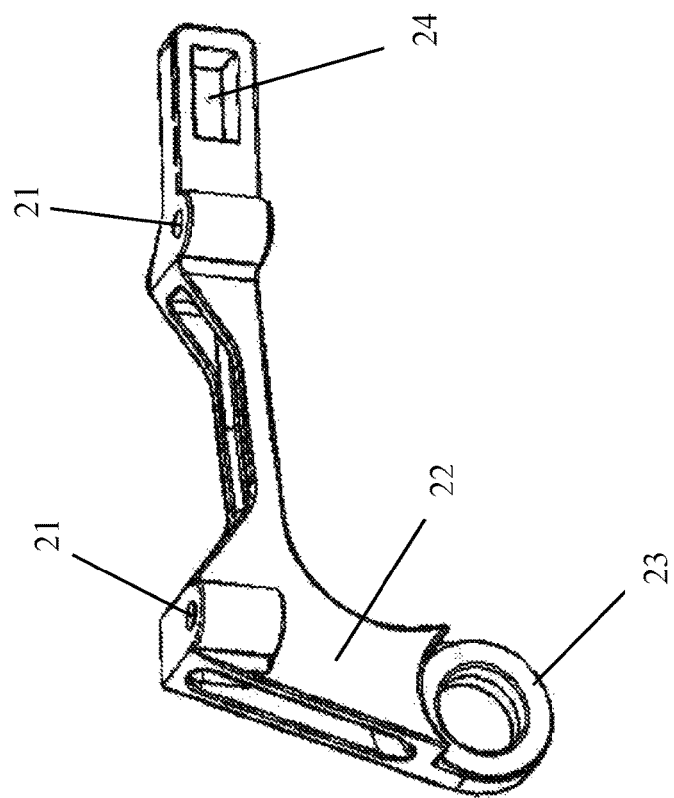
FIG. 2 illustrates the brake bracket of the present invention.

With regard to FIG. 2, shown is the brake bracket 20 of the present invention. With two pivots (11,14) in close proximity of the rear axle 13, a moving brake bracket 20 was contemplated. Without a moving brake bracket, the rear wheel will spin backwards and pull on the chain causing large pedal kickback during braking conditions where there is suspension travel. The brake bracket 20 must pivot around the rear axle 13 while remaining firmly located during all suspension movements. As a result, the brake bracket 20 of the present invention was developed where the rearward portion rotates around a boss on the axle plate 12 by which the rear axle 13 passes through. Rear axle bushings 23 (or bearings) are pressed into the brake bracket 20 for smooth rotation and translation, and the brake bracket 20 is sandwiched between the rear wheel and the axle plate 12 to retain axial positioning during suspension movement. The design of the present invention allows for rear wheel assembly/disassembly without the need for brake readjustment.

Figure 3:
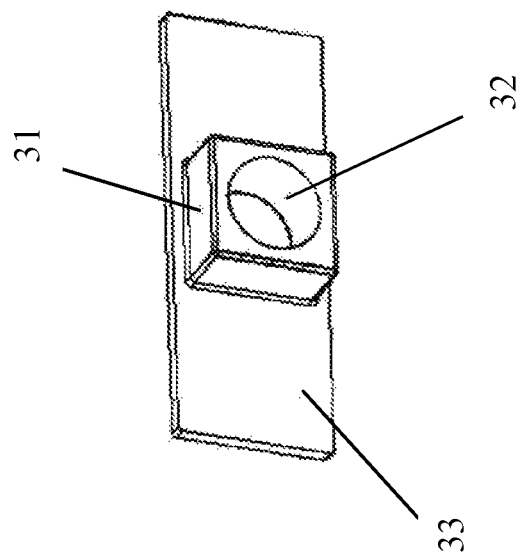
FIG. 3 illustrates the forward brake mount bushing of the present invention.

With regard to FIG. 3, shown is a custom forward brake mount bushing 30 of the present invention. The forward portion of the bracket, as can be seen in FIG. 2, must now provide for translation and rotation to ensure positional accuracy. This is accomplished by a single mount to the chain stay (not shown) that slides in a slot (24 shown in FIG. 2) and also rotates through the use of bushings 30. The bushing 30 is further comprised of a rotating mount hole 32 surrounded by top and bottom sliding slot surfaces 31 positioned centrally in relation to a dust shield 33. The brake bracket and bushing 30 combination is of ample width to support locating needs through the suspension travel and still keep the brake in proper position.

Figure 4:
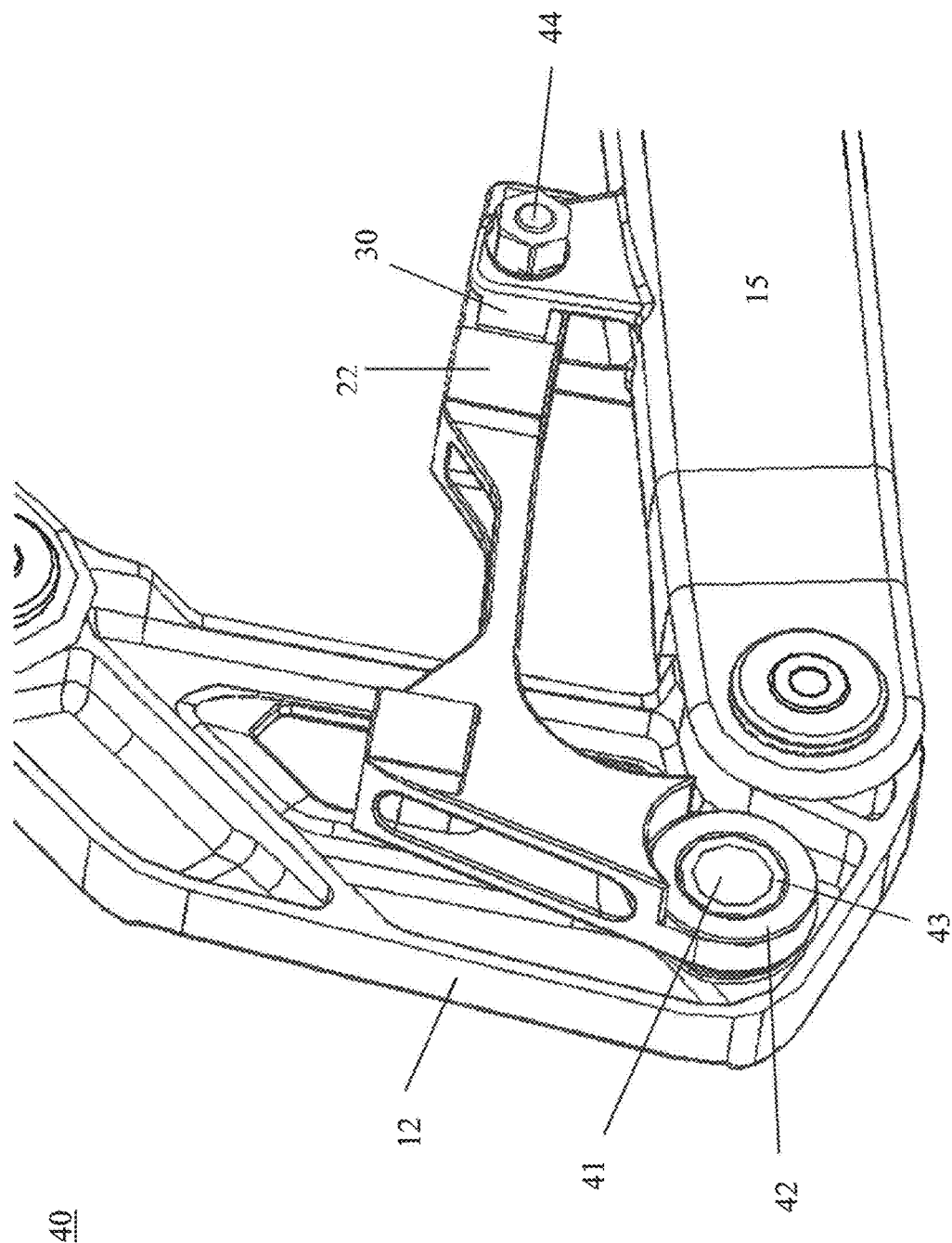
FIG. 4 illustrates a close-up of the brake bracket assembly.

The brake bracket 22 and bushing 30 are shown assembled in FIG. 4. The configuration of the present invention results is a brake bracket 22 that not only holds position, but more importantly, transmits the braking forces away from the direction of suspension movement and eliminates brake induced suspension compression. A redirection of forces is accomplished by angling the bracket so that the tangential braking force is directed through the chain stay 15 to the main frame during the suspension movement. One additional benefit of the brake bracket translation that should be noted is that during suspension movement while braking, the rear wheel rotates forward to oppose chain growth otherwise known as pedal kickback. An axle plate boss 43 having the rear axle 13 pass through it is designed to enable rotation of the brake bracket 22 around the axle plate boss 43 during suspension movement. The brake bracket 22 further allows for attaching the chain stay 15 at mounting bolt 44 through rotation and translation slot 24 (not shown) while enabling movement during suspension travel. In an alternative configuration, the brake bracket forward mount 44 may be attached to the seat stay 6 and achieve similar results of force transfer during braking with proper system design. The described brake bracket 22 is an integral part of the defined improvements to the bicycle suspension system of the present invention. In an alternative embodiment, the brake bracket 22 may be used with a variety of suspension systems proving similar force transfer and counter rotation benefits.

Figure 5:
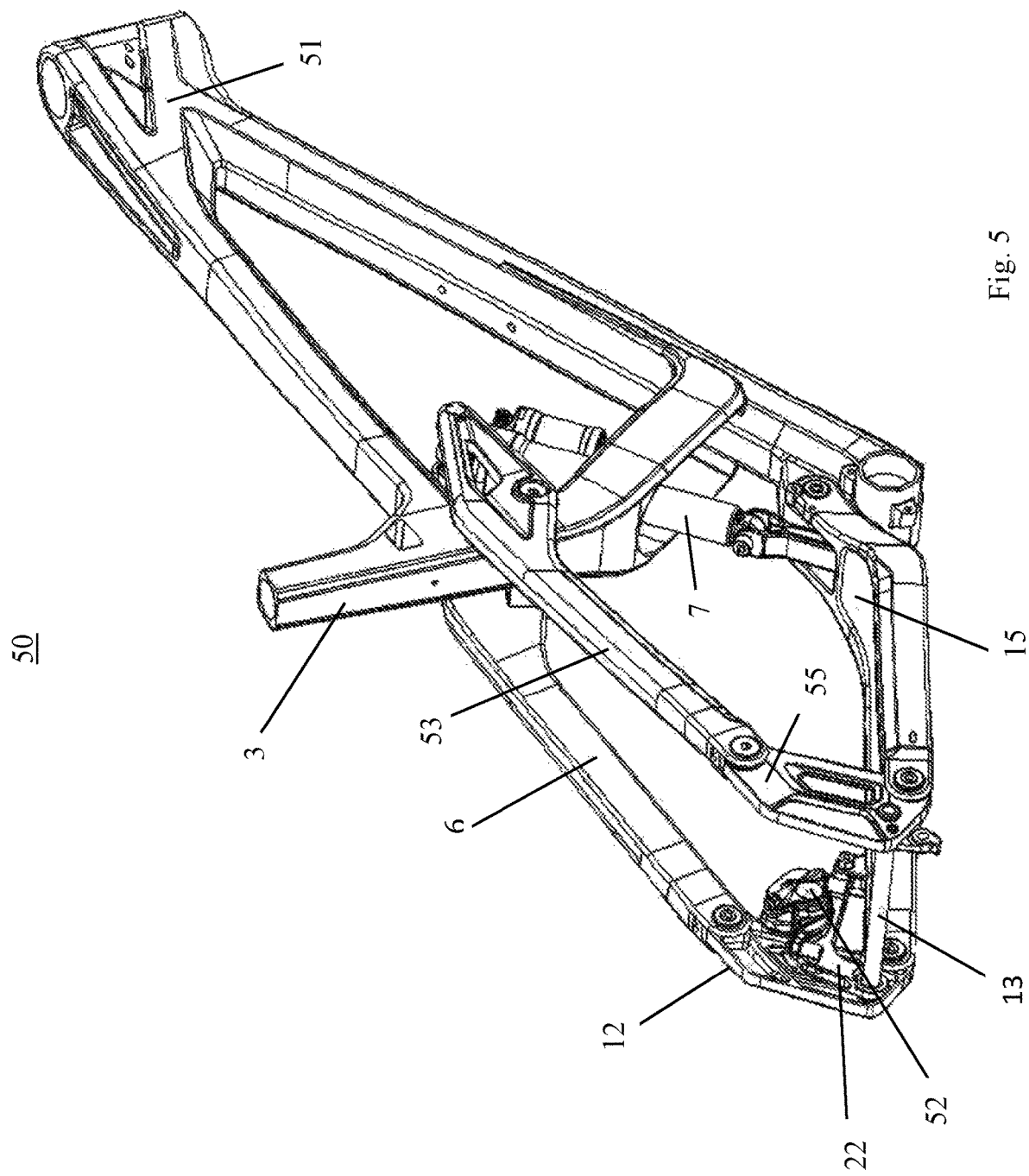
FIG. 5 illustrates an alternative view of the rear frame assembly of the present invention.

With regard to FIG. 5, shown is an alternative view of the frame of the present invention having both sides of the seat stay 6. Turning to the components in more detail, a left side of seat stay 6 and a right side of seat stay 53 pass on either side of the seat tube 3 and a cross brace (not shown) holds the first seat stay 6 and the second seat stay 53 together at the seat tube 3. A first axle plate 12 and a second axle plate 55 are used to attach the left seat stay 6 and right seat stay 53, respectively, to the rear axle 13. A brake caliper 52 can be attached to a brake bracket 22 which is further attached to the first axle plate 12.

Figures 6, 7:
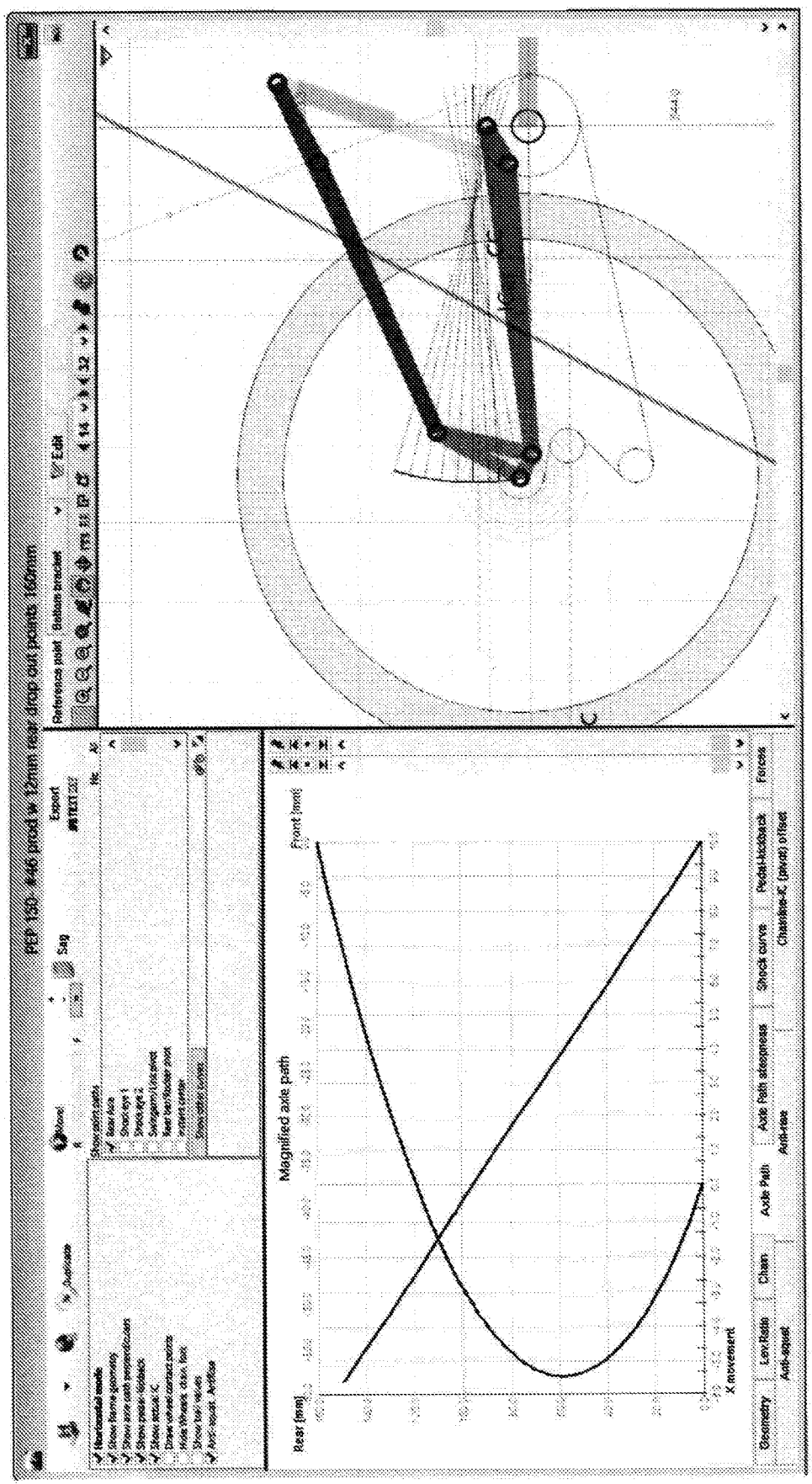
FIG. 6 illustrates a graph of the rear axle path as it travels through the fore aft and vertical directions.
FIG. 7 illustrates a visual representation of the graph in FIG. 6 showing the axle path of the present invention.

With regard to FIG. 6, shown is a graphical representation (curved line) of the path of the rear axle as it moves through suspension travel in the fore aft and vertical (rearward and negative x) directions. FIG. 7 is a visual representation to accompany FIG. 6 showing the axle path as associated with the present invention.

One embodiment of the present invention provides a bicycle frame for providing increased suspension to a bicycle, the bicycle frame comprising:

a head tube,
    a top tube,
    a down tube,
    a seat tube, a chain stay,
a seat stay,
an upper shock mount,
a lower shock mount,
a shock,
a rear axle plate and
a brake bracket and bushing.

Another embodiment of the present invention provides a head tube configured to hold a set of handle bars.

In another embodiment of the present invention there is provided the top tube and the down tube connected to the head tube.

A further embodiment of the present invention provides a seat tube connected to the top tube, the down tube and a bottom bracket wherein the seat tube, top tube, down tube and bottom bracket form a rigid front triangle.

Still another embodiment of the present invention provides a chain stay rotatably coupled to the seat tube at a chain stay pivot.

Yet another embodiment of the present invention provides a seat stay rotatably couple to the seat tube at a seat stay pivot.

A further embodiment of the present invention provides an upper shock mount attached to a distal end of the seat stay forward of the seat stay pivot.

In another embodiment of the present invention there is provided a lower shock mount attached to the chain stay rearward of the seat stay pivot.

Still another embodiment of the present invention provides a shock connected to the upper shock mount and the lower shock mount passing the seat tube from forward to rearward.

Another embodiment of the present invention provides a rear axle plate attached to the seat stay and the chain stay and is configured to accommodate a rear axle.

Yet another embodiment of the present invention provides a bicycle frame having four distinct pivot points.

A further embodiment of the present invention provides the bicycle frame described further comprising a floating brake design.

It will be appreciated that details of the foregoing embodiments, given for purposes of illustration, are not to be construed as limiting the scope of this invention. Although several embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A bicycle frame for providing increased suspension to a bicycle, the bicycle frame comprising:
   a head tube configured to hold a fork and set of handle bars;
   a top tube connected to the head tube and a down tube;
   a seat tube connected to the top tube, the down tube and a bottom bracket;
   a chain stay;
   a seat stay;
   a shock positioned between and connected to an upper shock mount and a lower shock mount;
   rear axle plates;
   a rear axle passing through the rear axle plates; and
   a brake bracket and bushing, wherein the brake bracket is comprised of a single component having a forward translation and rotational mount and a rearward rotational mount, wherein the forward portion of the brake bracket is further comprised of a single mount that slides in a slot and further rotates using a bushing.

2. The bicycle frame of claim 1, wherein the bicycle frame is further comprised of four distinct pivot points.

3. The bicycle frame of claim 2, wherein the seat tube, top tube, down tube and bottom bracket form a rigid front triangle.

4. The bicycle frame of claim 2, wherein the chain stay is rotatably coupled to the seat tube at a chain stay pivot.

5. The bicycle frame of claim 2, wherein the seat stay is rotatably coupled to the seat tube at a seat stay pivot.

6. The bicycle frame of claim 5, wherein an upper shock mount is attached to a distal end of a seat stay forward of the seat stay pivot.

7. The bicycle frame of claim 6, wherein the lower shock mount is attached to the chain stay rearward of the seat stay pivot.

8. The bicycle frame of claim 7, wherein the shock is connected between the upper shock mount and the lower shock mount.

9. The bicycle frame of claim 8, wherein a moving brake remains firmly located when the brake bracket pivots around the rear axle.

10. The bicycle frame of claim 9, wherein the rear axle centerline is less than 300 mm from axle plate pivot points.

11. The bicycle frame of claim 6, wherein the lower shock mount is attached to the chain stay forward or at the seat stay pivot.

12. The bicycle frame of claim 1, wherein the bushing is further comprised of a rotating mount hole surrounded by top and bottom sliding slot surfaces positioned centrally in relation to a dust shield.

13. The bicycle frame of claim 1, wherein the brake bracket is capable of pivoting around the rear axle at a rearward position of the brake bracket.

14. The bicycle frame of claim 1, wherein the brake bracket is positioned between a rear wheel and an axle plate.

* * * * *